United States Patent [19]
Vanderborgh et al.

[11] Patent Number: 4,804,592
[45] Date of Patent: Feb. 14, 1989

[54] COMPOSITE ELECTRODE FOR USE IN ELECTROCHEMICAL CELLS

[75] Inventors: Nicholas E. Vanderborgh; James R. Huff, both of Los Alamos, N. Mex.; Johna Leddy, Flushing, N.Y.

[73] Assignee: The United States of America as represented by the United States Department of Energy, Washington, D.C.

[21] Appl. No.: 109,133

[22] Filed: Oct. 16, 1987

[51] Int. Cl.$^4$ ......................... H01M 8/10; H01M 4/86
[52] U.S. Cl. ......................................... 429/33; 429/42; 204/283
[58] Field of Search ....................... 429/30, 32, 33, 40, 429/41, 42; 204/282, 283

[56] References Cited
U.S. PATENT DOCUMENTS 3,423,247  1/1969  Darland et al. ......................... 429/40
4,602,426  7/1986  Kampe et al. ........................... 429/42

Primary Examiner—Donald L. Walton
Attorney, Agent, or Firm—Jack E. Ebel; Ray G. Wilson; Judson R. Hightower

[57] ABSTRACT

A porous composite electrode for use in electrochemical cells. The electrode has a first face and a second face defining a relatively thin section therebetween. The electrode is comprised of an ion conducting material, an electron conducting material, and an electrocatalyst. The volume concentration of the ion conducting material is greatest at the first face and is decreased across the section, while the volume concentration of the electron conducting material is greatest at the second face and decreases across the section of the electrode. Substantially all of the electrocatalyst is positioned within the electrode section in a relatively narrow zone where the rate of electron transport of the electrode is approximately equal to the rate of ion transport of the electrode.

43 Claims, 2 Drawing Sheets

COMPOSITE ELECTRODE FOR USE IN ELECTROCHEMICAL CELLS

This invention is the result of a contract with the Department of Energy (Contract No. W-7405-ENG-36).

BACKGROUND OF THE INVENTION

The present invention relates to a composite electrode for use in electrochemical cells, and more particularly, to a composite electrode for use in fuel cells, such as hydrogen/oxygen fuel cells.

Certain fuel cells convert chemical energy into electrical energy by reacting different gases at electrocatalytic surfaces on anode and cathode electrodes which are positioned on opposite sides of an ion exchange membrane. Generally, the gas introduced to the anode is categorized as a fuel while the gas introduced to the cathode is an oxidant. Utilizing hydrogen/oxygen solid electrolyte fuel cells as illustrative, hydrogen is introduced via a gaseous stream to the anode side of an ion exchange membrane and is electrochemically oxidized in the presence of a suitable catalyst, such as platinum or a platinum alloy, in accordance with the following general reaction:

$$H_2 = 2H^+ + 2 \text{ electrons} \tag{1}$$

Oxygen is introduced to the cathode side of the ion-conducting membrane in a second gaseous stream and, is electrochemically reduced in accordance with the following general reaction:

$$O_2 + 4H^+ + 4 \text{ electrons} = 2H_2O \tag{2}$$

Conventionally, fuel cells are designed by positioning an ion exchange membrane within a reactant chamber to define an anode compartment on one side of the ion exchange membrane and a cathode compartment on the other side of the ion exchange membrane. Electrodes are postioned in each compartment and the chamber is equipped with suitable manifolds for the introduction of gaseous streams into the anode and cathode compartments. The reactant chamber also has outlets for product water and any unreacted gases. The ion exchange membrane is a permselective ion transporting membrane, i.e., selectively transports only anions or cations depending upon the charge of groups bound within the polymeric matrix of the ion exchange membrane. In a hydrogen/oxygen fuel cell, protons liberated during electrochemical oxidation of hydrogen are selectively transported through the ion exchange membrane to the cathode. Traditionally, the electrodes used in fuel cells have been coated with or are comprised of an electrocatalyst, such as platinum or a platinum containing compound, to increase the rate of the electrochemical oxidation and reduction reactions occurring in the anode and cathode compartments, respectively. The electrons generated in the anode compartment are collected by a current collector and are transported through an external circuit which contains a load to the cathode compartment. Current collectors can be constructed of any suitable electrically conductive material, such as any stable metal or a carbon black. Often, the material of which the reactant chamber is constructed functions as the current collector. As conventionally constructed, fuel cells can operate at approximately 60% efficiency, i.e., convert approximately 60% of the available chemical energy in the reacting fuel to electricity while the remaining 40% is converted to thermal energy.

Fuel cell operation involves three separate modes of transport. First, the introduction of reactant gases into the fuel cell, for example, a hydrogen/oxygen fuel cell, from a supply source and movement of these gases through the fuel cell during operation involves molecular transport. Also, movement of water formed as a result of the electrochemical reduction of oxygen in accordance with reaction (2) within the hydrogen/oxygen fuel cell involves molecular transport. Secondly, transport occurs as protons, i.e., hydrogen ions, produced as a result of reaction (1), move from the anode compartment electrode, through the ion exchange membrane, and into the cathode compartment electrode of the fuel cell where electrochemical reduction occurs. Lastly, electrons generated in accordance with the electrochemical oxidation reaction (1) are transported via a current collector through an external conductive path having an electrical load to the cathode compartment to serve as a reactant for the electrochemical reduction of oxygen. Fuel cell performance is reduced by any internal impedance to any one of the three modes of transport which occur during operation thereof.

In an effort to reduce the internal resistance to transport, particularly proton and electron transport, and thereby increase fuel cell performance, fuel cells designs have evolved to a "zero-gap" configuration wherein the reaction chamber, electrodes and ion exchange membrane are positioned in a continguous relationship. To achieve a "zero-gap" configuration and the attendant reduction in internal resistance to transport, conventional electrode structures, such as a wire mesh screen coated with an electrocatalyst, have been embedded on each surface of the ion exchange membrane. Additionally, composite electrodes of ion exchange polymers, metals or carbon compounds, and electrocatalytic compounds have been utilized in an effort to construct an electrode wherein an electron conductor, a proton conductor, and an electrocatalyst are incorporated into a three-phase interface to minimize internal resistance to transport.

Solid ion exchange polymers having fixed anionic sites in the form of sorbed anions or chemically bonded anions have been used to form the permselective ion exchange membrane used in fuel cells. Recently, polymers possessing sorbed or grafted ions of strong proton acids, for example, sulfonic or phosphonic acids, have been employed as ion exchange membranes in fuel cells due to the relatively rapid proton transfer thereof. Nafion ®, a perfluorosulfonic acid membrane, has gained increasing popularity as an ion exchange membrane for fuel cells. Typically, the ion exchange membrane is constructed of a relatively thin, e.g., 0.002–0.012 in. thick, sheet or film of an active ion exchange polymer. Several separate sheets or films of active ion exchange polymers, each of which possesses different conducting and/or wetting properties, can be thermally laminated to form a unitary ion exchange membrane for use in fuel cells.

With the advent of the unitary, relatively thin ion exchange membranes and electrode assemblies, fuel cells have been arranged in a stacked configuration. As such, the plate or housing separating the anode and cathode compartments of two adjacent fuel cells electrically connects the fuel cells in series by conducting electrons generated in the anode of one fuel cell directly to the cathode of an adjacent fuel cell. This common plate is referred to as a "bipolar plate" and additionally serves as a positive barrier to prevent mixing of anode and cathode gas flows between adjacent cells. Thus, the relatively low voltage generated by a single fuel cell, 0.5–0.9V, can be added in series to obtain useful voltages of, for example, 120V.

As previously mentioned, composite electrodes comprising a homogeneous mixture of an ion exchange polymer, an electrical conductor, and an electrocatalyst have been supported for use in fuel cells. The ion exchange polymer, for example, Nafion ®, serves the function of a composite binder and an electrolyte for conducting cations. An electrical conductor, such as carbon powder, functions not only to conduct electrons but also as a catalyst support. These composites are formed with a filler material which is subsequently removed by application of specific aqueous solutions or heat to provide a porous electrode matrix which allows gaseous reactants to flow therethrough. Accordingly, an electrode matrix structure is provided which forms a conductive skeleton for transport of both electrons and protons relatively uniform throughout the entire electrode. However, loading catalyst throughout the proposed composite electrode significantly increases the amount of catalyst in the electrode thereby promoting fuel cell catalyst inefficiency since only a portion of the loaded catalyst is utilized in the electrochemical reactions.

Accordingly, it is an object of the present invention to construct a composite electrode for use in electrochemical cells in which substantially all of the electrocatalyst used in fabricating the electrochemical cell is positioned only along a zone within the electrode where the transparent rates of electrons and protons are approximately equal.

Another object of the present invention is to provide a composite electrode for use in electrochemical cells which is constructed to have increasing electronic conductivity from the catalyst loading zone to a current collector on one face of the electrode, and to have increasing protonic conductivity from the zone of catalyst loading to the face of the electrode which engages the ion exchange membrane of the electrochemical cell.

It is a further object of the present invention to provide a composite electrode for use in electrochemical cells wherein the amount of electrocatalyst necessary to achieve the highest electrochemical cell performance, as measured by the value of watts per mg of electrocatalyst, is minimized.

It is still a further object of the present invention to provide a composite electrode for use in electrochemical cells wherein the electrocatalyst is more efficiently utilized, as measured by the voltage of a single electrochemical cell.

SUMMARY OF THE INVENTION

To achieve the foregoing and other objects, and in accordance with the purposes of the present invention, as embodied and broadly described herein, one characterization of the present invention may comprise a porous composite electrode for use in electrochemical cells. The electrode has a first face and a second face defining a relatively thin section therebetween. The composite electrode has means for conducting ions, means for conducting electrons, and an electrocatalyst. The volume concentration of the ion conducting means is greatest at the first face and is decreased across the section, while the volume concentration of the electron conducting means is greatest at the second face and decreases across the section of the electrode. Substantially all of the electrocatalyst is positioned within the electrode section in a relatively narrow zone where the rate of electron transport of the electrode is approximately equal to the rate of ion transport of the electrode.

In another characterization of the present invention, a porous composite electrode for use in electrochemical cells is provided which is comprised of three zones. A first zone conducts both electrons and ions liberated by electrochemical reactions occurring within the electrochemical cell. The rate at which the first zone transports electrons is greater than the rate at which the first zone transports ions. A second zone conducts both electrons and ions and has an ion transport rate greater than the electron transport rate thereof. A third zone is contiguous with both the first and second zones and has approximately equal ion and electron transport rates. An electrocatalyst for increasing the rate of the electrochemical reactions is almost entirely positioned within the third zone.

In yet another characterization to the present invention, an electrochemical cell comprises a current collector means for conducting electrons generated by electrochemical reactions of fuel within the electrochemical cell, an ion conductor means for selectively conducting preselected ions liberated by the electrochemical reactions, and a composite electrode positioned between the collector means and the ion conductor means. The composite electrode has ion and electron transport rates which vary across the section thereof and has an electrocatalyst which is positioned along a zone within the section of the electrode wherein the ion and electron transport rates are substantially equal.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
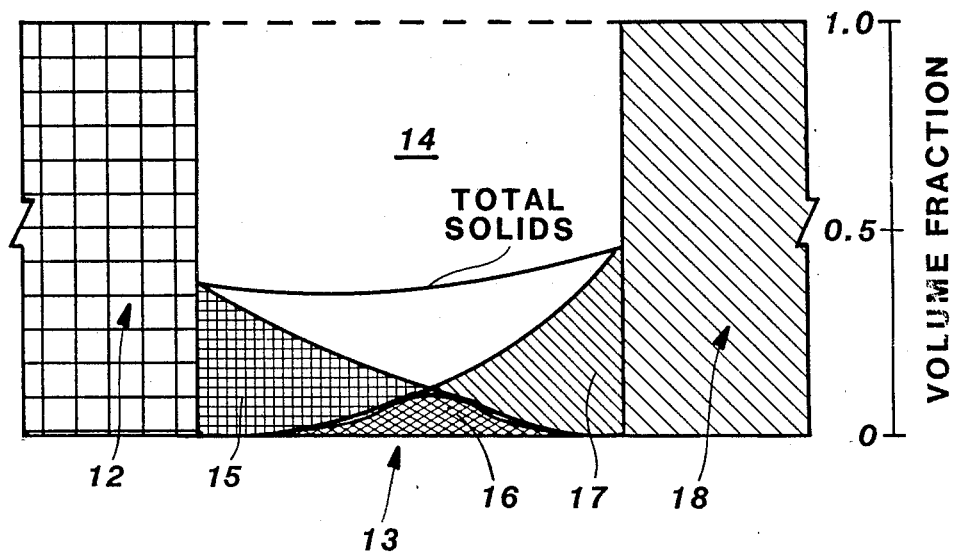
FIG. 1 is a partially cutaway cross-sectional pictorial view depicting the volume fraction of the components of a composite electrode of the present invention as assembled in an electrochemical cell.

Referring now to FIG. 1, the composite electrode of the present invention is illustrated generally as 10 and is interposed between a solid ion exchange membrane 18 and a current collector 12, as is well known in the art. Current collector 12 may be a portion of a reactor vessel of an electrochemical cell, a bipolar plate of a series of stacked, individual fuel cells, or another suitable electrical conductor. Current collector 12 can be constructed of any suitable electron conducting material, such as nickel, most other metals, graphite (a conducting form of carbon), or a graphite plastic composite which possesses sufficient electron conduction for use with the electrode of the present invention, as hereinafter described. Current collector 12 is preferably constructed of a corrosion resistant metal, such as nickel, or a graphite plastic composite which includes a binder, for example, a composite of 80 wt % carbon black, such as Vulcan XC-72 ® manufactured by Cabot Corporation, and 20 wt % polyvinylidene fluoride, such as Kynar ® manufactured by Pennwalt Corporation.

Membrane 18 can be fabricated from any suitable ion exchange polymer which functions as a selective ion transporting material, as is well known in the electrochemical art. Membrane 18 can be constructed of Nafion 117 ®, a 0.007 in. thick polyperfluorosulfonic acid membrane manufactured by Du Pont Corporation. Polyperfluorocarboxylic acid polymers are also suitable ion exchange polymers for use as membranes 18. Solid composite electrode 13 of the present invention is a relatively thin sheet, film, or wafer, e.g., 0.010 in., defining a generally rectilinear configuration. Electrode 13 is comprised of an ion exchange polymer 17 which has a chemical composition and transport properties similar to the ion exchange polymer used to construct the ion exchange membrane 18, a current conducting material 15, such as the material utilized to construct current collector 12, and an electrocatalyst 16. Electrocatalyst 16 functions in part to accelerate the electron transport necessary in the operation of the composite electrode of the present invention. Suitable electrocatalyst can be selected from the noble metal group, in particular, platinum, rhodium, palladium or alloys thereof, or from metalorganic compounds, such as iron or cobalt porphyrin compounds or iron or cobalt phthalocyanine compounds, that have been thermally treated, in a conventional manner. The electrocatalyst can be employed either as relatively small, metallic particles, i.e., metal blacks, or as small particles supported on conducting substrates. Preferably, $100-200 \times 10^{-8}$ cm deposited on larger carbon particles are utilized as the electrocatalyst in the composite electrode of the present invention.

Polyperfluorosulfonic acids, typified by the Nafion ® class of polymers manufactured by Du Pont, are prepared by the copolymerization of tetrafluoroethylene and a vinyl ether monomer that terminates with sulfuryl fluoride group, i.e., $-SO_2F$. The resulting polymer product can be heat processed into sheets or other desired shapes by conventional methods. The processed polymers are then hydrolyzed in a concentrated aqueous base solution at elevated temperatures, e.g., a 30 wt % KOH solution at 90° C. During hydrolysis, the nonionic sulfuryl group is chemically converted to a sulfonic acid anion, $-SO_3^-$. After hydrolysis, the polymers contain bound anionic groups that attract available cations to form an ion exchange network. Thermal properties of the hydrolyzed polymer are altered such that the hydrolyzed polymer cannot be heat processed. At elevated fuel cell operating temperatures, i.e., greater than 100° C., dehydration of the membrane, electrode interface occurs which can be detrimental to ion transport. Accordingly, at such elevated temperatures, other materials which exhibit relatively high ionic conduction at high temperatures, such as phosphoric acid or certain metal oxides, for example, iridium oxide or tungsten oxide can be selected as an ion exchange material in lieu of the ion exchange polymer 17 for utilization in the composite electrode of the present invention.

The present invention is based upon the discovery that by creating a relatively narrow zone or plane within a composite fuel cell electrode wherein the rate of electron transport is approximately equal to the rate of proton transport and by loading substantially all of the electrocatalyst utilized in the composite electrode only within this zone, electrocatalyst use and fuel cell performance, as measured by the number of watts generated per mg of electrocatalyst or by voltage efficiency, are signficantly increased. Positioning the electrocatalyst along a zone of substantially equal protonic and electronic transport also provides for maximum utilization of the available electrocatalyst sites due to the resulting decreased residence time of a reacting gas molecule on any such site.

The effective rate at which material 15 conducts electrical current, i.e., electrons, and the rate at which ion exchange polymer 17 conducts protons, i.e., hydrogen ion flux, are directly proportional to the volume concentration of each of these materials within electrode 13. The electron flux, i.e, the current (mol/s-cm$^2$), increases toward current collector 12, while the proton flux, i.e., the ionic flow (mol/s-cm$^2$), increases toward membrane 18 since each separate electrocatalytic site can serve as the locus of electron transfer, and each ion must move toward the membrane. Accordingly, the volume concentration of current conducting material 15 and polymer 17 is graded through the cross section of electrode 13 to correspond to the varying proton and electron flux. Current conducting material 15 has the greatest volume concentration within electrode 13 along the interface of the electrode with the current collector 12. The concentration of the current conducting material 15 decreases across the cross section of electrode 13. The volume concentration of the ion exchange polymer 17 within electrode 13 is greatest at the interface of electrode 13 with membrane 18 and is decreased across the section of electrode 13. Electrocatalyst 16 is concentrated at that plane of zone along the section of electrode 13 wherein the transport rate of electrons (as determined by the electron conductivity and the volume fraction of material 15) and the transport rate of protons (as determined by the proton conductivity and the volume fraction of material 17) are substantially equal.

Solid composite electrode 13 of the present invention provides varied transport rates for both electrons and protons (in a hydrogen/oxygen fuel cell) across the section thereof. The electron conductivity increases toward the electrode, current collector interface, while the proton conductivity increases toward the electrode, ion exchange membrane interface. The electrocatalyst is concentrated intermediate in the electrode section in that relatively narrow plane or zone 16 where the transport rate of electrons, expressed on a volume basis, is approximately equal to the transport rate of protons, expressed on a volume basis.

Electron and proton transfer rates are generally expressed using the value of conductivity for a given material, or reciprocally, as the value of its resistivity. The basic unit of resistivity is ohm/cm per cm$^2$. Resistance of a given material to either electron or proton transport is measured by determining the voltage drop across that material while a known flux occurs through that material and scaling that resistance to the volume fraction of that material within a particular composition. The resistance of a given material to either ions or electrons can be defined as scaled to the corresponding volume fraction by the expression set forth below. Thus, the electronic resistance, $R_e(i)$, in any volume element, i, is related to the bulk resistance, $R_b$, by the expression:

$$R_e(i) = R_b/kf \quad (3)$$

where f is the volume fraction, and k is an empirical coefficient that counts for nonlinear effects in volume mixing. Accordingly, equal electron and proton conductivity can be expressed as:

$$(X_1)(R_3) = (X_2)(R_p) \quad (4)$$

wherein $X_1$ is the thickness of the path of electron conductance from the zone of equal electron and proton conductivity to the current collector interface, $X_2$ is the thickness of the path of proton conductivity from the zone of equal electron and proton conductivity to the membrane interface, $R_e$ is the effective transfer resistance of electrons through the electron transfer path, and $R_p$ is the effective transfer resistance of protons through the proton transfer path. Thus it can be appreciated that $X_1$ and $X_2$ must be adjusted to account for differences in $R_e$ and $R_p$. As the rates of electron transport are typically faster than the rate of proton transport, $X_2$ must be designed to be less than $X_1$. Accordingly, the zone of relatively equal proton and electron transport rates, i.e., the zone of high electrocatalyst loading, is located closer to the membrane interface than the current collector interface of the composite electrode 13. The exact positioning of this zone in an optimized composite electrode is a function of the $R_e$ and $R_p$ values, as determined by the exact materials used to fabricate electrode 13.

The composite electrode of the present invention must be fabricated such that reacting molecules of fuel gases introduced into the fuel cell have accessibility to electrocatalytic sites throughout the electrode. Efficient gas transport rates are directly dependent upon adequate porosity throughout the electrode. Accordingly, the composite electrode of the present invention is provided with a porosity sufficient to permit the uninhibited flow of reactant gases and water in the form of steam. The bulk porosity of electrode 13, defined as the volume of gas in electrode 13 divided by the total volume of electrode 13, is about 0.6 to about 0.7. This bulk porosity provides for a relatively uniform distribution of gaseous reactants throughout the structure of composite electrode 13. The void necessary to create such porosity can be fabricated by use of porous sheets or grids of materials, as hereinafter described, or by use of filler materials which are dissolved or thermally removed after fabrication of electrode 13.

The porosity of electrode 13 can vary across the section thereof and, as illustrated in FIG. 1, should increase at the electrode, current collector interface to permit gaseous reactants access to the zone where the electrocatalyst is concentrated. The electrocatalyst is dispersed throughout this zone to form thin, high-surface area layers on the electron conducting solids within this zone. By increasing the porosity in this zone where catalyst loading is concentrated, gas flow (molecular transport) is maximized in that area of electrode 13 wherein reactivity is maximized. Flows of gaseous reactants are introduced to electrode 13 from an external source by utilizing flow manifolds and other structural configurations which are well known in the art.

Figure 2:
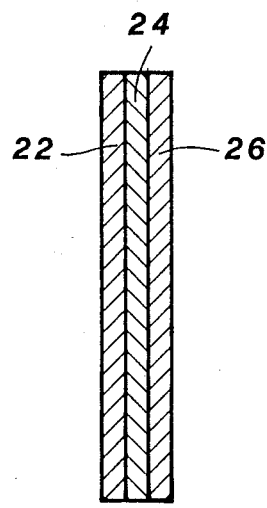
FIG. 2 is a cross-sectional pictorial view of a preferred composite electrode of the present invention.

In one embodiment, the composite electrode 13 of the present invention is formed of three separate layers or zones as illustrated generally in FIG. 2 as 22, 24, and 26. Each layer or zone comprises a mixture of carbon black, platinum or other suitable electocatalyst dispersed and supported on carbon black, polytetrafluoroethylene as a binder, and a suitable ionic conducting material, such as polyperfluorosulfonic acid. Suitable carbon black for use in manufacturing the composite electrode of the present invention possesses a relatively high surface area, a high electrical conductivity, and a low chemical reactivity. Vulcan XC-72® manufactured by Cabot Corporation is a preferred carbon black. It is preferred to utilize a relatively high surface area platinum (e.g., 20 m²/gm) in the form of a carbon black with approximately 15 wt % platinum loaded on the surface thereof. Polytetrafluoroethylene is commercially available as a fine suspension, i.e., a fine powder dispersed in a solvent, such as water. Polyperfluorosulfonic acid or polyperfluorocarboxylic acid polymers are available as suspensions in solvents, such as mixtures of water and methanol or as unhydrolyzed forms. The latter form permits the use of such polymers as a thermal plastic binder. The compositional and dimensional parameters for each layer or zone are set forth below in Table 1.

TABLE 1

| Layer/Zone | Thickness | Porosity | Carbon | C—Pt | PTFE | PFSA |
|---|---|---|---|---|---|---|
| 22 | $5 \times 10^{-4}$ cm | 0.60 | .233 mg | .171 mg | .066 mg | .021 mg |
| 24 | $9 \times 10^{-4}$ | 0.40 | 0 | 2.48 | .119 | .119 |
| 26 | $1 \times 10^{-4}$ | 0.20 | 0 | .069 | .079 | .422 |

Materials are: carbon = porous carbon black; C—Pt = supported Pt on carbon black, 15 wt % Pt; PTFE = polytetrafluoroethylene; PFSA = perfluorosulfonic acid; quantities are given on a area basis, mg/cm².

Thus, the thickness of the composite electrode is $1.5 \times 10^{-3}$ cm. Each zone is prepared by combining the constituents dispersed in a suitable dispersant, such as hexane or other low boiling point liquids, in accordance with the formulation set forth above, and spraying a layer of the resulting dispersion on either current collector 12 or membrane 18. Accurate layer thickness may be readily achieved by one skilled in the spray coating art utilizing conventional apparatus. At least one zone is applied to each of the membrane 18 and collector 12, and thereafter, the membrane 18, collector 12, and layers 22, 24, and 26 are thermally bonded to each other to form the composite electrode of the present invention.

Figure 3:
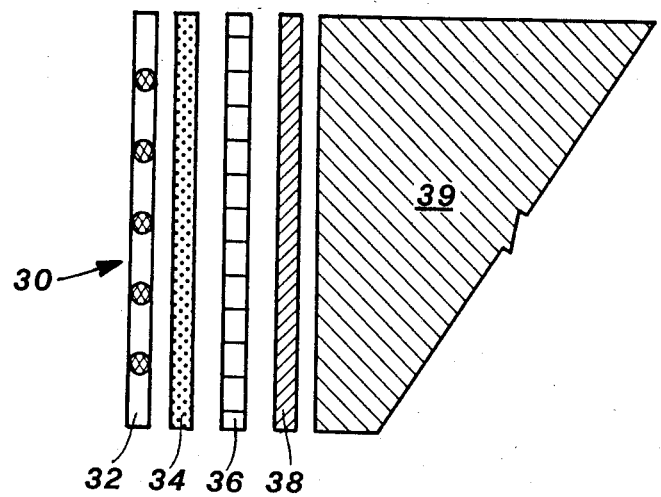
FIG. 3 is a partially cutaway cross-sectional pictorial view of a composite anode of the present invention as assembled with an solid ion exchange membrane of a fuel cell.

Referring now to FIG. 3, a structure of a composite anode electrode for use in a fuel cell, such as a hydrogen/oxygen fuel cell, is illustrated. The composite anode is illustrated in FIG. 3 generally as 30 and comprises layers 32, 34, 36, and 38. Layer 32 is an 0.05 in. thick carbon grid constructed of graphitized carbon and possessing relatively high physical strength, e.g., crush strength greater than 300 psi, and electrical resistivity, e.g., 0.01 ohm-cm. Layer 32 is constructed with pore openings (mesh) of approximately $50-100 \times 10^{-4}$ cm to permit efficient migration of reactant gases uniformly through the layer. The electrical conductivity of layer 32 permits rapid transport of electrons to the current collector 12 with low resistance loss. Layer 32 is treated with hydrophobic materials, such as elemental fluorine, to decrease the wetting tendencies thereof.

Layer 34 is a porous carbon sheet having a thickness of about $1-2 \times 10^{-4}$ cm. Layer 34 may be fabricated by hot pressing a mixture of a conductive carbon black and an unhydrolyzed ion exchange polymer, such as unhydrolyzed Nafion ® polymer in powder form. The concentrations of carbon black and unhydrolyzed ion exchange polymer are selected so that layer 34 possesses an electron transport rate which is greater than, e.g., approximately twice, its proton transport rate. Layer 34 is subsequently heated to melt the ion exchange polymer which functions as a binder therein.

Layer 36 is comprised of the same materials as layer 34 but the concentrations of carbon black and the unhydrolyzed ion exchange polymer are altered so that the electron transport rate of layer 36 is approximately equal to the proton transport rate thereof. Following hot pressing the mixture as described with respect to layer 34, layer 36 is sprayed with a solution containing platinum, ruthenium, or a mixture thereof. For example, layer 36 is sprayed with an alcohol solution of platinum and ruthenium chlorides at ambient temperature and pressure. Layer 36 is sprayed with an amount of solution necessary to obtain a catalyst loading of 1 mg/cm$^2$ or less. Subsequently, the catalyst is chemically reduced to convert the catalytic metals to their elemental form. Such chemical reduction may require the use of hydrazine or another moderate reducing agent which can be applied as a liquid.

Layer 38 is also constructed of the same materials as layer 34 except that the concentrations of carbon black and unhydrolyzed ion exchange polymer are varied so that the proton transport rate of layer 34 is greater than, e.g., approximately twice, the electron transport rate of layer 38. Layer 38 is prepared by hot pressing a thin ($10 \times 10^{-4}$ cm) mixture of carbon black and an unhydrolyzed ion exchange polymer.

Solid composite anode 30 is then assembled by stacking layers 32-38 against a sheet or wafer of unhydrolyzed ion exchange polymer 39 (as illustrated), such as unhydrolyzed Nafion ® polymer, having a thickness of between about 0.076 cm—about 0.013 cm, and hot pressing the stacked layers to bond the resultant composite anode 30 together and to the thicker sheet or wafer of unhydrolyzed Nafion ® polymer. The resultant laminate is immersed in an aqueous base, e.g., 6 molar sodium hydroxide, at approximately 80°-100° C. to hydrolyze the ion exchange polymer, thereby forming an active ion exchange material. This treatment is continued until substantially all of the sulfuryl fluoride groups are hydrolyzed to the sulfonic acid anion. The resulting laminate is subsequently washed in deionized water and submerged in a dilute electrocatalyst-containing solution, e.g., an aqueous solution of a platinum salt. The laminate is treated with a chemical reducing agent to reduce the platinum both in the ion exchange membrane 18 and the electrode 30. It is important to note that the amount of electrocatalyst loaded throughout the laminate in this step may be less than 5 wt % of the amount of electrocatalyst loaded into intermediate layer 36 of composite anode 30.

Figure 4:
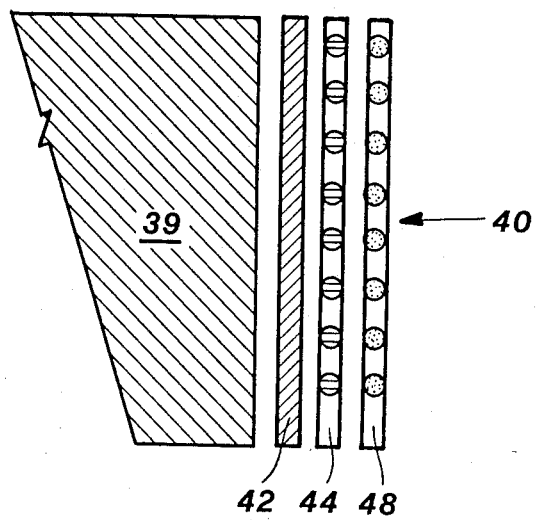
FIG. 4 is a partially cutaway cross-sectional pictorial view of a composite cathode of the present invention as assembled with the composite anode and a solid ion exchange membrane of a fuel cell as illustrated in FIG. 3.

Referring now to FIG. 4, a solid composite cathode of the present invention is illustrated generally as 40 and is comprised generally of layers 42, 44, and 48. Layer 42 is a composite of a unhydrolyzed ion exchange polymer, such as unhydrolyzed Nafion ®, and a precatalyzed graphite powder. The graphite powder, a conductive carbon, is first pretreated by thermal treatment in a controlled environment using well-known carbon technology to control the oxidative stability thereof. Subsequently, the carbon power is treated with a platinum salt solution and chemically reduced to yield a thin coating of platinum on the surface of the carbon. Relatively small concentrations of platinum are required in this layer, i.e., substantially less than 0.1 mg/assembled cm$^2$ of electrode area. This catalyzed carbon is mixed with unhydrolyzed ion exchange polymer and then hot pressed into a thin sheet or film. The concentrations of graphite powder and unhydrolyzed ion exchange polymer are selected to provide layer 42 with a proton transport rate which is greater than, e.g., approximately twice, its electron transport rate.

Layer 44 is a composite blend that is prepared by weaving a cloth of strands of the unhydrolyzed ion exchange polymer which are spun-cast into fibers and of heat treated carbn fibers. Relatively thin fibers of each material are employed so that the resultant fabric has a relatively large number of intersections between the two types of fibers. The concentrations of carbon fibers and ion exchange polymer fibers are selected to provide layer 44 with a proton transport rate approximately equal to its electron transport rate. An organic macrocycle compound containing iron or cobalt is utilized to catalyze this fabric. A suitable electrocatalyst, as previously described, is deposited by either solution deposition or carbon pretreatment. Utilizing solution deposition, a compound, such as a cobalt tetramethoxytetraphenylporphyrin, is dissolved in a solvent, such as tetrahydrofuran. The fabric is immersed into this solution and the porphyrin adsorbs onto the carbon surfaces. This immersion can be repeated. The fabric is subsequently dried at approximately 100° C. to remove any excess organic solvent, and thereafter heat treated to bind the porphyrin to the fabric. A short period of intense heating (850°-950° C.) from an infrared source, such as an intense IR laser, will selectively heat the carbon black surfaces converting porphyrin to its catalytic form and binding it to carbon. Utilizing carbon pretreatment, the carbon fibers are first coated with the porphyrin before weaving. For example, the carbon fibers are immersed in a solution of cobalt tetramethoxytetraphenylporphyrin dissolved in tetrahydrofuran and are pyrolyzed (850°-950°) to convert the porphyrin to its catalytic form and bind it to carbon. The resulting fiber is woven with the unhydrolyzed ion exchange polymer to form the fabric utilized as layer 44.

Layer 48 is comprised of a layer of highly conductive graphitized cloth containing a relatively small amount of unhydrolyzed ion exchange polymers which is treated with a low platinum loading in a manner similar to the treatment of layer 42. The concentrations of graphite (i.e., carbon) and ion exchange polymer are selected to provide layer 48 with an electron transport rate greater than, e.g., approximately twice, its proton transport rate. This layer may also be treated with hydrophobic materials to control wetting in a manner described hereinabove with respect to layer 32 of solid composite anode 30. Layers 42, 44, and 48 are stacked and heated under pressure (50-60 psi) until the unhydrolyzed ion exchange polymer melts to bond the layers together. The resultant laminate composite is hydrolyzed in the manner described herein with respect to anode 30 until substantially all of the sulfuryl groups are hydrolyzed to sulfonic acid anion groups.

As illustrated in FIGS. 3 and 4, the preferred solid composite anode 30 and solid cathode 40 of the present invention can be assembled together by first heating an alcohol solution of a hydrolyzed ion exchange polymer, such as Nafion ®, which is formed by heating that material in an alcohol solution and spray coating the heated solution onto the ion exchange membrane integrally formed with the composite anode structure 30 and the exposed face 42 of the composite cathode 40. The two structures are subsequently heated and bonded together by adhering the exposed face of layer 42 to the exposed face of the ion exchange membrane 18.

Throughout the description, the composite electrode of the present invention has been characterized as suitable for assembly in a fuel cell, such as a hydrogen/oxygen fuel cell. As will be evident to those skilled in the art, the composite electrode of the present invention can be utilized in electrochemical devices which produce electrical power or chemical compounds. For example, the present invention is applicable to systems wherein water in liquid or vapor state is electrolyzed to generate hydrogen and oxygen, to the synthesis of chlorine which is driven by electrical energy, or to the synthesis of other materials of commercial interest, such as the production of organic acids from alkanes. In general, the present invention can be utilized to fabricate electrodes useful for the electrochemical generation of electrical power from the consumption of reacting gases or liquids or the electrochemical generation of chemical compounds from the consumption of electrical power.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A porous composite electrode for use between an electron conductor and an ion exchange membrane of an electrochemical cell, said electrode having a first face and a second face defining a relatively thin section therebetween, said composite electrode comprising:
   an ion conducting material which selectively conducts certain ions therethrough, said electrode having a volume concentration of said ion conducting material which is greatest at said second face and which is decreased across the section of said electrode thereby defining a transport rate of ions which correspondingly varies across the section of said electrode;
   an electron conducting material having a volume concentration within said electrode which is greatest at said first face and which is decreased across the section of said electrode thereby defining a transport rate of electrons which correspondingly varies across the section of said electrode; and
   an electrocatalyst positioned along a zone within the section of said electrode wherein said transport rate of electrons and said transport rate of ions are substantially equal.

2. The porous composite electrode of claim 1 wherein said zone of substantially equal electron and ion transport rates is located at a distance closer to said second face than said first face.

3. The porous composite electrode of claim 1 wherein said electrode has a porosity which varies across the section of said electrode and which is the greatest at said first face.

4. The porous composite electrode of claim 1 wherein said electrode has a bulk porosity of from about 0.6 to about 0.7.

5. The porous composite electrode of claim 1 wherein said electron conducting material is a stable metal, a graphite or a graphite plastic composite.

6. The porous composite electrode of claim 1 wherein said ions are protons and said ion conducting material is an ion exchange polymer described from the group consisting of polyperfluorosulfonic acid polymers and polyperfluorocarboxylic acid polymers.

7. The porous composite electrode of claim 1 wherein said electrocatalyst is a noble metal of a metalorganic compound.

8. The porous composite electrode of claim 7 wherein said electrocatalyst is a noble metal selected from the group consisting of platinum, rhodium, palladium, and alloys thereof.

9. The porous composite electrode of claim 7 wherein said electrocatalyst is a metalorganic compound selected from the group consisting of cobalt porphyrin compounds, iron porphyrin compounds, cobalt phthalocyanine compounds, iron phthalocyanine compounds, or mixtures thereof.

10. An electrochemical cell comprising:
    current collector means for conducting electrons generated by electrochemical reactions of fuel within said electrochemical cell;
    ion conductor means for selectively conducting preselected ions liberated by said electrical reactions; and
    a composite electrode positioned between said collector means and said ion conductor means, said composite electrode having varying ion and electron transport rates therethrough and having an electrocatalyst positioned within a zone in the section of said electrode wherein said rates are substantially equal.

11. The electrochemical cell of claim 10 wherein said composite electrode has first face and a second face defining a relatively thin section therebetween and is positioned between said current collector means and said ion conductor means such that said first face is contiguous with said current collector means thereby defining a first interface and said second face is contiguous with said ion conductor means thereby defining a second interface.

12. The electrochemical cell of claim 11 wherein said composite electrode comprises:
    an ion conducting material which selectively conducts said certain ions therethrough, said ion conducting material having a volume concentration which is greatest at said second interface and which is decreased across the section of said electrode thereby defining a rate of ion transport which correspondingly varies across the section of said electrode; and an electron conducting material having a volume concentration which is greatest at said first interface and which is decreased across the section of said electrode thereby defining a rate of electron transport which correspondingly varies across the section of said electrode.

13. The electrochemical cell of claim 12 wherein said zone of substantially equal electron transport and ion transport is located at a distance closer to said second interface than said first interface.

14. The electrochemical cell of claim 12 wherein said electrode has a porosity which varies across the section of said electrode and which is the greatest at said first face.

15. The electrochemical cell of claim 12 wherein said electrode has a porosity of from about 0.6 to about 0.7.

16. The electrochemical cell of claim 12 wherein said electron conducting material is a stable metal, a graphite, or a graphite plastic composite.

17. The electrochemical cell of claim 12 wherein said ions are protons and said ion conducting material is an ion exchange polymer selected from the group consisting of polyperfluorosulfonic acid polymers and polyperfluorocarboxylic acid polymers.

18. The electrochemical cell of claim 12 wherein said electrocatalyst is a noble metal or a metalorganic compound.

19. The electrochemical cell of claim 18 wherein said electrocatalyst is a noble metal selected from the group consisting of platinum, rhodium, palladium, and alloys thereof.

20. The electrochemical cell of claim 18 wherein said electrocatalyst is a metalorganic compound selected from the group consisting of cobalt porphyrin compound, iron porphyrin compounds, cobalt phthalocyanine compounds, iron phthalocyanine compounds, or mixtures thereof.

21. A porous composite electrode for use in an electrochemical cell having a first face and a second face defining a section therebetween, said composite electrode comprising:

ion conductor means defining an ion transport rate through said electrode, said electrode having a volume concentration of said ion conductor means which is the greatest at said first face and which is decreased across said section;

electron conductor means defining an electron transport rate through said electrode, said electrode having a volume concentration of said electron conductor means which is the greatest at said second face and which is decreased across said section; and an electrocatalyst positioned within said section in a relatively narrow zone where the rate of electron transport is approximately equal to the rate of ion transport.

22. The porous composite electrode of claim 21 wherein said zone of substantially equal electron and ion transport rates is located at a distance closer to said first face than said second face.

23. The porous composite electrode of claim 21 wherein said electrode has a porosity which varies across the section of said electrode and which is the greatest at said second face.

24. The porous composite electrode of claim 21 wherein said electrode has a porosity of from about 0.6 to about 0.7.

25. The porous composite electrode of claim 21 wherein said conductor means is constructed of an electron conducting material selected from the group consisting of a stable metal, a graphite, and a graphite plastic composite.

26. The porous composite electrode of claim 21 wherein said ions are protons and said ion conductor means is constructed of an ion exchange polymer selected from the group consisting of polyperfluorosulfonic acid polymers and polyperfluorocarboxylic acid polymers.

27. The porous composite electrode of claim 21 wherein said electrocatalyst is a noble metal or a metalorganic compound.

28. The porous composite electrode of claim 27 wherein said electrocatalyst is a noble metal selected from the group consisting of platinum, rhodium, palladium, and alloys thereof.

29. The porous composite electrode of claim 27 wherein said electrocatalyst is a metalorganic compound selected from the group consisting of cobalt porphyrin compounds, iron porphyrin compounds, cobalt phthalocyanine compounds, iron phthalocyanine compounds, or mixtures thereof.

30. A porous composite electrode for use in an electrochemical cell comprising:

a first zone for conducting both electrons and ions liberated by electrochemical reactions in said electrochemical cell, the rate at which said first zone transports said electrons being greater than the rate at which said first zone transports ions;

a second zone for conducting both electrons and ions liberated by said electrochemical reactions, the rate at which said second zone transports said ions being greater than the rate at which said second zone transports electrons;

a third zone contiguous with said first and said second zones and having an ion transport rate and an electron transport rate which are approximately equal; and an electrocatalyst for increasing the rate of said electrochemical reactions, substantially all of said electrocatalyst being positioned within said third zone.

31. The porous composite electrode of claim 30 wherein at least 95 wt % of said electrocatalyst is positioned within said third zone.

32. The porous composite electrode of claim 30 wherein each of said first, said second, and said third zones comprises a mixture of carbon black and an ion exchange polymer.

33. The porous composite electrode of claim 32 wherein said ion exchange is a polyperfluorosulfonic acid polymer.

34. The porous composite electrode of claim 33 wherein each of said first, said second, and said third zones further comprises a binder.

35. The porous composite electrode of claim 34 wherein said binder is polytetrafluoroethylene.

36. The porous composite electrode of claim 32 wherein said electrocatalyst is a metalorganic compound selected from the group consisting of cobalt porphyrin compounds, iron porphyrin compounds, cobalt phthalocyanine compounds, iron phthalocyanine compounds, or mixtures thereof, said electrocatalyst being supported on the surface of said carbon black.

37. The porous composite electrode of claim 30 further comprising:
a fourth zone for conducting electrons and being contiguous with said first zone.

38. The porous composite electrode of claim 37 wherein said fourth zone is a relatively thick graphite grid having a mesh of approximately $50-100 \times 10^{-4}$ cm.

39. The porous composite electrode of claim 30 wherein said third zone comprises a mixture of a precatalyzed graphite and an ion exchange polymer.

40. The porous composite electrode of claim 30 wherein said second zone comprises strands of an ion exchange polymer and fibers of heat treated carbon woven together.

41. The porous composite electrode of claim 30 wherein said first zone comprises strands of an ion exchange polymer and fibers of graphite woven together.

42. The porous composite electrode of claim 30 wherein the rate at which said first zone transports electrons is approximately twice the rate at which said first zone transports ions.

43. The porous composite electrode of claim 30 wherein the rate at which said second zone transports ions is approximately twice the rate at which said second zone transports electrons.

* * * * *